(12) United States Patent
Vrielink

(10) Patent No.: US 8,475,306 B2
(45) Date of Patent: Jul. 2, 2013

(54) CHAIN TRANSMISSION

(75) Inventor: André Vrielink, Dronten (NL)

(73) Assignees: Flevobike V.O.F., Dronten (NL);
Koninklijke Gazelle N.V., Dieren (NL)

( * ) Notice: Subject to any disclaimer, the term of this patent is extended or adjusted under 35 U.S.C. 154(b) by 742 days.

(21) Appl. No.: 12/530,074

(22) PCT Filed: Feb. 26, 2008

(86) PCT No.: PCT/NL2008/050115
§ 371 (c)(1),
(2), (4) Date: Jan. 28, 2010

(87) PCT Pub. No.: WO2008/108641
PCT Pub. Date: Sep. 12, 2008

(65) Prior Publication Data
US 2010/0190593 A1    Jul. 29, 2010

(30) Foreign Application Priority Data
Mar. 5, 2007    (NL) ..................................... 2000519

(51) Int. Cl.
*F16H 9/00*        (2006.01)
*F16H 59/00*    (2006.01)
*F16H 61/00*    (2006.01)
*F16H 63/00*    (2006.01)

(52) U.S. Cl.
USPC .............................................. 474/81; 474/78

(58) Field of Classification Search
USPC ...................................... 474/78, 81
See application file for complete search history.

(56) References Cited

U.S. PATENT DOCUMENTS

| | | | | |
|---|---|---|---|---|
| 836,707 | A | * | 11/1906 | Richter ........................... 474/81 |
| 971,219 | A | * | 9/1910 | Schatz ............................ 474/81 |
| 975,356 | A | * | 11/1910 | Hanson .......................... 474/81 |
| 1,029,495 | A | * | 6/1912 | Elkin .............................. 474/81 |
| 1,036,487 | A | * | 8/1912 | Hagan ............................ 474/81 |
| 1,089,152 | A | * | 3/1914 | Pletz .............................. 474/81 |
| 1,288,338 | A | * | 12/1918 | Widmer ......................... 474/81 |
| 1,440,482 | A | * | 1/1923 | Mills .............................. 474/81 |
| 3,848,448 | A | * | 11/1974 | Allen ............................. 474/81 |
| 3,906,809 | A | * | 9/1975 | Erickson ........................ 474/83 |
| 4,599,079 | A | * | 7/1986 | Chappell ........................ 474/80 |
| 7,294,076 | B2 | * | 11/2007 | Matsumoto et al. ........... 474/78 |

(Continued)

FOREIGN PATENT DOCUMENTS

| | | |
|---|---|---|
| DE | 908 832 | 4/1954 |
| DE | 195 26 382 | 1/1997 |
| DE | 196 40 681 | 4/1998 |

*Primary Examiner* — William A Rivera
*Assistant Examiner* — Henry Liu
(74) *Attorney, Agent, or Firm* — Oblon, Spivak, McClelland, Maier & Neustadt, L.L.P.

(57) ABSTRACT

There is disclosed a chain transmission comprising a driving shaft provided with one or more sprockets and a driven shaft provided with complementary sprockets, which is coupled to the driving shaft via a chain. Preferably, two chain-moving elements are provided between the driving shaft and the driven shaft, near the sprockets, by means of which a desired transmission ratio can be set via axial movement of the chain. The chain-moving elements are movable over respective gear-shifting elements upon rotation of said elements, making it possible to shift from one sprocket combination to another with a reduced risk of malfunctions. The transmission is accommodated in a closed, self-supporting casing built up of interconnected casing members, in which the shafts in question are supported.

20 Claims, 2 Drawing Sheets

U.S. PATENT DOCUMENTS

| | | | |
|---|---|---|---|
| 7,361,109 B2 * | 4/2008 | Kilshaw | 474/81 |
| 7,597,638 B2 * | 10/2009 | Cooke | 474/78 |
| 8,066,596 B1 * | 11/2011 | Kilshaw | 474/81 |
| 2006/0019782 A1 * | 1/2006 | Wickliffe | 474/80 |
| 2006/0073925 A1 * | 4/2006 | Kaga et al. | 474/78 |
| 2006/0270499 A1 * | 11/2006 | Kilshaw | 474/78 |
| 2008/0261735 A1 * | 10/2008 | Cappellini | 474/78 |

* cited by examiner

CHAIN TRANSMISSION

The present invention relates to a chain transmission.

The present invention also relates to a vehicle provided with such a transmission and to a method for influencing the transmission ratio of the chain transmission.

Such a chain transmission, in the form of a single or a double derailleur, the latter comprising two sets of chain rings or sprockets, viz. at the front and at the rear, is generally known.

It is also common knowledge that the operation of such a transmission is affected by the way in which the chain is moved from one sprocket to the other. Faulty shifting does happen at times, for example, in particular in daily use, because no attention is paid to the actual position of a front and/or a rear sprocket, and to the next gear position which, given the actual gear position, is practical from that position. To prevent faulty shifting, a specific shifting sequence must be maintained, a skill that needs to be acquired. Furthermore, gears partially overlap in prior art transmissions, which not only leads to confusion, but which, in addition, is not very efficient, and which unnecessarily increases the amount of material and space that is needed, and thus the cost price. In addition, the prior art transmissions have the drawback that shifting gears in principle is not possible when the bicycle is stationary or being reversed.

The object of the present invention is to provide a compact, relatively trouble-free chain transmission of robust construction, which makes it possible to shift to another transmission ratio even when the vehicle is stationary or being reversed.

In order to accomplish that object, the chain transmission according to the present invention exhibits a driving shaft provided with one or more sprockets, a driven shaft provided with complementary sprockets, at least one chain-moving element mounted on a gear shifting shaft and provided between the driving shaft and the driven shaft, near one or the other of the sprockets of the driving shaft or driven shaft, by means of which a desired transmission ratio can be set via axial movement of the chain, wherein the at least one chain-moving element comprises a set of axially movable chain retaining side plates mounted to a sliding block which is movable over the gear shifting shaft.

The advantage of the chain transmission according to the invention is that the chain-shifting element is positioned between the driving shaft and the driven shaft, so that an efficient use of the available space is made. The principle of axially moving the chain to another sprocket at a position between the aforesaid shafts, close to the sprockets, opens the way to shifting gears not only when a vehicle fitted with the chain transmission is moving forward, but also in other situations. With the chain transmission according to the invention, shifting to another transmission ratio is possible during reverse movement of the sprockets or the crank shaft.

One embodiment of the chain transmission according to the invention is characterised in that the chain-moving element comprises a set of axially movable side plates, between which the chain is retained.

The side plates, which are thus provided close to the sprockets and which retain the chain, make it possible to realise a precise control of the chain movements, so that faulty shifting is prevented and the reliability of the chain transmission according to the invention is enhanced.

The chain-moving element can be mounted on a gear-shifting shaft extending parallel to and between the driving shaft and the driven shaft, the advantages being a simple construction, easy fitting and removal.

A preferred embodiment of the chain transmission according to the invention is characterised in that the chain transmission comprises at least one guide shaft provided between the driving shaft and the driven shaft, on which there is mounted an element having a conical shape such that a ridge moving over the element, which is connected to the side plates, moves at least one end of the side plates that are movable over the gear-shifting shaft to a position close to a contact point between the chain and the respective sprocket with every transmission ratio that is set.

In this embodiment, the side plates are inclined towards the contact point where the chain makes contact with the sprocket or, on the contrary, becomes detached therefrom, and in case of a double chain transmission this applies both to the front sprockets and to the rear sprockets, so that, following a prescribed course of the chain-moving elements, this results in a sequential and even movement of the chain over the envelope of the sprockets.

If the two rotatable gear-shifting shafts are coupled, only one rotary movement will be required for enabling only sequential movement from one sprocket to an adjacent sprocket, so that faulty switching even has become impossible. In that case a chain transmission according to the invention is obtained which is so reliable and low-maintenance that it may be accommodated in a closed casing without any problem, so that, in addition, dust and dirt no longer get a chance to cause extra wear. The various shafts are furthermore preferably all aligned with each other between the driving shaft and the driven shaft, so that the casing can remain compact and be self-supporting, with the gear-shifting shafts being supported in interconnected casing members of the casing.

Further advantageous embodiments of the chain transmission, the vehicle and the method according to the invention are defined in the other dependent claims.

In particular the chain transmission and the method according to the present invention will now be explained in more detail with reference to the figures below, in which like parts are indicated by the same numerals, and in which.

Figures 1, 2:
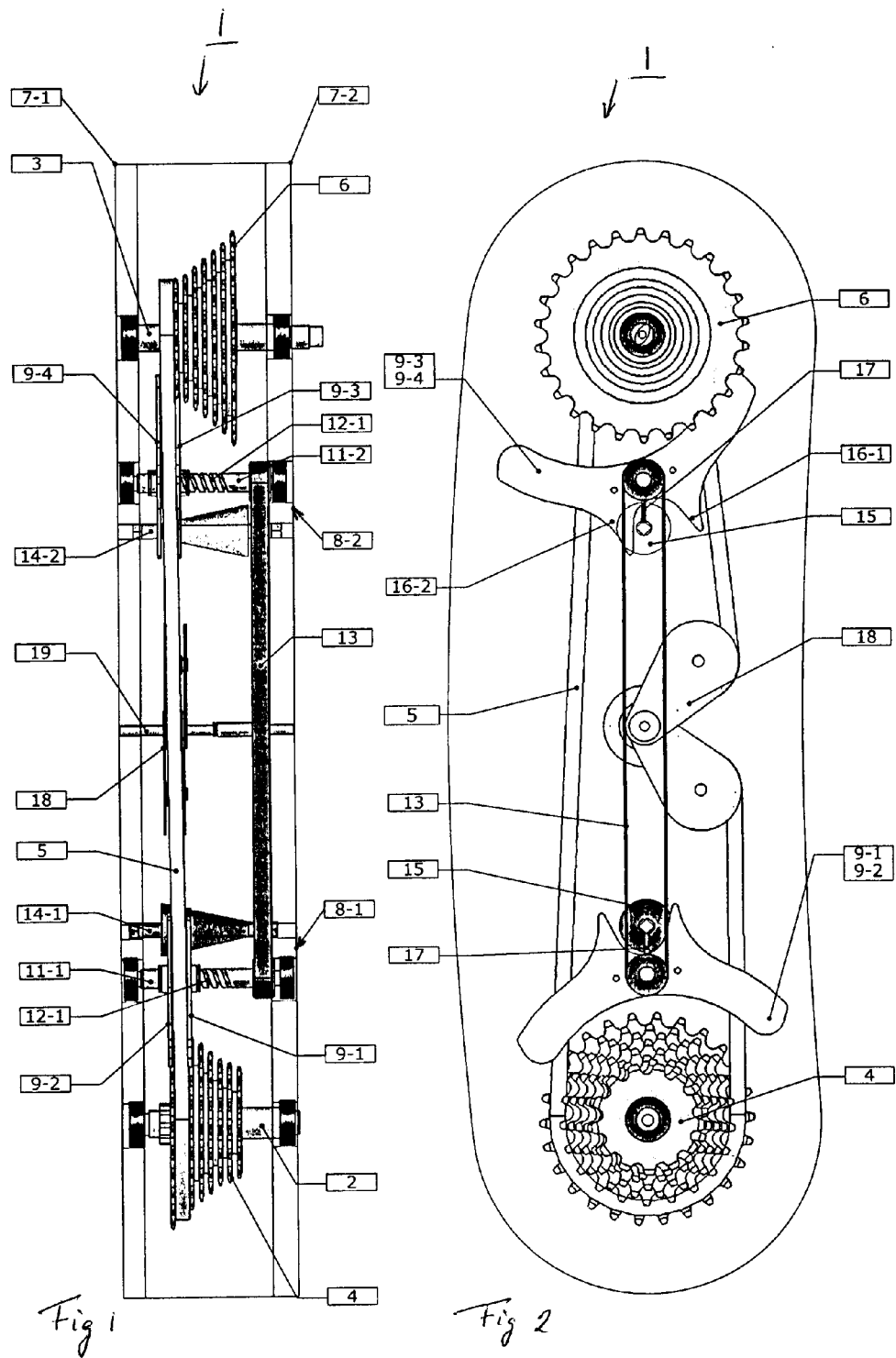
FIG. 1 is a top plan view of a preferred embodiment of the chain transmission according to the invention.
FIG. 2 is a side view of the chain transmission of FIG. 1.

FIG. 1 is a top plan view and FIG. 2 is a side view of a chain transmission 1, which may for example be used as an automatic or a non-automatic transmission on a to-wheeled or multi-wheeled vehicle, such as a bicycle, a reclining bicycle, a delivery bicycle, a rickshaw or a, usually small, motorised or non-motorised carrier vehicle or, for example, a vehicle for the handicapped. The chain transmission 1 comprises two shafts 2, 3, one being the driving shaft 2, which, for example in the case of a bicycle, is fixedly connected to the crank axle and on which a number of sprockets 4, forming a front package, are fixedly mounted, and the other being the driven shaft 3, which is driven by the chain 5, on which a number of complementary sprockets 6, forming a rear package, are mounted via a freewheel. The rear sprockets 6 can freewheel in reverse direction. When the transmission 1 is being driven, the chain 5 rides on one of the sprockets 4 and one of the complementary sprockets 6, which sprockets 4, 6 have different diameters with mutually different numbers of teeth. The shafts 2 and 3 of the chain transmission 1 are supported in a closed, self-supporting casing 7 built up of interconnected casing members 7-1, 7-2, in which all the parts of the transmission 1 yet to be explained are accommodated. This prevents dirt, sand and the like from finding its way into the transmission 1, thus reducing wear as well as the risk of malfunctions.

The chain 5 can be moved over the sprockets 4 and 6 by means of at least one chain-moving element 8 provided between the driving shaft 2 and the driven shaft 3, near the sprockets 4 and/or 6. The embodiments shown in FIGS. 1, 2 and 3 comprise two chain-moving elements 8-1 and 8-2, by means of which a desired transmission ratio can be set via axial movement of the chain 5. In principle one shifting element 8 suffices. In the aforesaid embodiment, which will be explained in more detail hereinafter, the movement of the chain 5 for the various sprockets 4, 6 is guided near the two sprocket packages 4, 6, resulting in a more reliable operation of the transmission 1 without any blocking. Each chain-moving element 8 has a set of axially movable, in this case crescent-shaped side plates 9-1, 9-2; 9-3, 9-4, within which the chain 5 runs.

Figure 3:
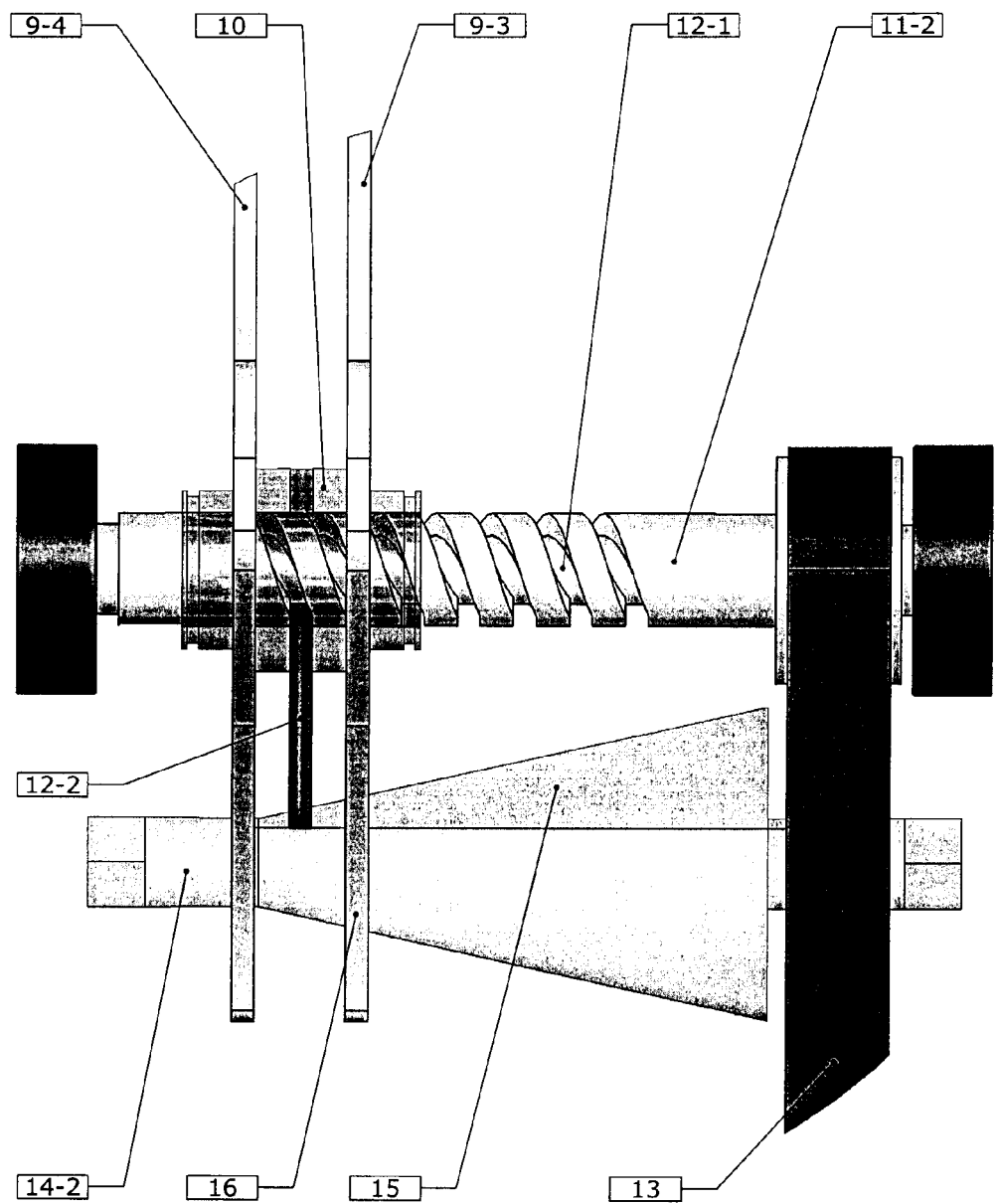
FIG. 3 is a detail view of a gear-shifting shaft and a guide shaft as used in the embodiment of FIG. 1.

As shown in the detail view of FIG. 3, each set of rigidly interconnected side plates is rotatably mounted on a sliding block 10, which is movable over a gear-shifting shaft 11-2. For production reasons, the two gear-shifting shafts 11-1, 11-2 usually extend parallel to the driving shaft 2 and the driven shaft 3 in practice, preferably in alignment therewith. In principle, however, it is possible for the gear-shifting shafts 11-1, 11-2 not to extend parallel to the shafts 2, 3. The gear-shifting shafts 11-1 and 11-2, which are rotatably supported in the supporting casing 7, are provided with axial moving means 12, which are arranged for moving the sliding block 10 in axial direction upon rotation of the gear-shifting shaft 11. Said means 12 are to that end each provided with a groove 12-1, formed in the gear-shifting shaft 11-2 in this case, and a projection 12-2 formed on the sliding block 12, which moves in the groove 12-1 upon rotation of the gear-shifting shaft 11. In the embodiment comprising two gear-shifting shafts 11, said shafts are interconnected, without slip, by means of a toothed belt or a chain 13, for example, and they can be operated simultaneously, if desired, by means of a handle (not shown). The movements in opposite sense over the sprockets 4, 6 of the two packages for setting the desired transmission ratio take place in succession, so that the risk of faulty shifting is excluded. The at least one gear-shifting shaft 11-1, 11-2 may be operated by hydraulic, pneumatic or electric means, automatically, if desired, for setting the desired transmission ratio. In the case of electrical actuation, the use of an easily controllable, usual stepper motor may be considered, for example.

In the illustrated embodiment, the chain transmission 1 further comprises two guide shafts 14-1, 14-2, which are supported in the casing 7 between the driving shaft 2 and the driven shaft 3. On said shafts a conical element 15 is formed, whose conical configuration is such that upon rotation of the shaft 11, a ridge 16 formed on one end of the side plate 9-3, which moves over the element 15, causes the opposite ends of the side plates 9-3 and 9-4 to incline towards each other up to the contact point between the chain and the sprocket in question with any combination of the sprockets. If the conicity of the element 15 is related to the conicity of the envelope of the respective sprockets, indicated at 6 herein, the contact point will be precisely followed, and the side plates 9-3, 9-4 will guide the chain to a position close to the contact point where it moves onto or off the sprocket 6. The ridge 16 may form part of a fork 16-1, 16-2—see FIG. 2—within which the element 15 is positioned, as a result of which also the rotation of the side plates 9-3, 9-4 connected to the projection 16 over the sliding block 10 is limited.

The element 15 may be provided with a longitudinal slot 17 for receiving a protrusion, which may be the extension of the projection 12-2, for locking the sliding block against rotation during axial movement of the sliding block 10 over the gear-shifting shaft 11-1, 11-2.

The chain transmission 1 will furthermore comprise a suitable chain tensioner 18 provided at some point between the shafts 2 and 3, which chain tensioner is movable over a shaft 19, which shaft 19 is preferably supported in the casing 7 as well.

The helical grooves 12-1 in the respective gear-shifting shafts 11-1, 11-2 are staggered relative to each other, such that the change in the axial positions of the two chain-moving means 8-1, 8-2 defined thereby results in a smooth movement of the chain 5 alternately in either direction over the sprockets 4 and the complementary sprockets 6. Stops (not shown in the figures) are provided for limiting the extreme positions of the shifting means 8-1, 8-2.

The invention claimed is:

1. A chain transmission comprising:
   a driving shaft provided with one or more sprockets;
   a driven shaft provided with complementary sprockets, which is coupled to the driving shaft via a chain; and
   at least one chain-moving element mounted on a gear shifting shaft and provided between the driving shaft and the driven shaft, near one or the other of the sprockets of the driving shaft or driven shaft, by means of which a desired transmission ratio can be set via axial movement of the chain,
   wherein the at least one chain-moving element comprises a set of axially movable chain retaining side plates mounted to a sliding block which is movable over the gear shifting shaft,
   wherein the chain transmission comprises at least one guide shaft provided between the driving shaft and the driven shaft, on which guide shaft there is mounted an element having a conical shape, wherein the side plates comprise a ridge that moves over the element having a conical shape, and wherein the movement of the ridge over the element having a conical shape moves at least one end of the side plates to a position close to a contact point between the chain and the respective sprocket with every transmission ratio that is set, and
   wherein said ridge forms part of a fork within which said element is positioned, thus preventing excessive rotation of the side plates connected to the ridge over the sliding block.

2. A chain transmission according to claim 1, wherein the gear-shifting shaft is rotatable, being provided, together with the sliding block, with axial moving means arranged for moving the sliding block in an axial direction upon rotation of the gear-shifting shaft.

3. A chain transmission according to claim 2, wherein the gear-shifting shaft is provided with a groove, and the sliding block is provided with a projection that moves within the groove.

4. A chain transmission according to claim 1, wherein the conicity of said element is related to the conicity of the envelope of the respective sprockets.

5. A chain transmission comprising:
   a driving shaft provided with one or more sprockets;
   a driven shaft provided with complementary sprockets, which is coupled to the driving shaft via a chain; and
   at least one chain-moving element mounted on a gear shifting shaft and provided between the driving shaft and the driven shaft, near one or the other of the sprockets of the driving shaft or driven shaft, by means of which a desired transmission ratio can be set via axial movement of the chain, wherein the at least one chain-moving element comprises a set of axially movable chain retaining side plates mounted to a sliding block which is movable over the gear shifting shaft, wherein the chain transmission comprises at least one guide shaft provided between the driving shaft and the driven shaft, on which guide shaft there is mounted an element having a conical shape, wherein the side plates comprise a ridge that moves over the element having a conical shape, and wherein the movement of the ridge over the element having a conical shape moves at least one end of the side plates to a position close to a contact point between the chain and the respective sprocket with every transmission ratio that is set, and wherein said element is provided with a longitudinal slot for receiving a protrusion on the sliding block, which is locked against rotation.

6. A chain transmission according to claim 1, wherein the chain transmission comprises two chain-moving elements provided between the driving shaft and the driven shaft, near the sprockets and the complementary sprockets, respectively.

7. A chain transmission according to claim 6, wherein two gear-shifting shafts are rotatably interconnected.

8. A chain transmission according to claim 7, further comprising grooves in each of the gear-shifting shafts and staggered relative to each other, in such a manner that the change in the axial positions of the two chain-moving elements defined thereby causes the chain to move alternately over the sprockets and over the complementary sprockets.

9. A chain transmission according to claim 1, wherein the chain transmission is accommodated in a closed, self-supporting casing built up of interconnected casing members.

10. A vehicle provided with a chain transmission according to claim 1.

11. A chain transmission according to claim 1, wherein the gear shifting shaft extends parallel to the driving shaft and the driven shaft.

12. A chain transmission according to claim 5, wherein the gear-shifting shaft is rotatable, being provided, together with the sliding block, with axial moving means arranged for moving the sliding block in an axial direction upon rotation of the gear-shifting shaft.

13. A chain transmission according to claim 12, wherein the gear-shifting shaft is provided with a groove, and the sliding block is provided with a projection that moves within the groove.

14. A chain transmission according to claim 5, wherein the conicity of said element is related to the conicity of the envelope of the respective sprockets.

15. A chain transmission according to claim 5, wherein the chain transmission comprises two chain-moving elements provided between the driving shaft and the driven shaft, near the sprockets and the complementary sprockets, respectively.

16. A chain transmission according to claim 15, wherein two gear-shifting shafts are rotatably interconnected.

17. A chain transmission according to claim 16, further comprising grooves in each of the gear-shifting shafts and staggered relative to each other, in such a manner that the change in the axial positions of the two chain-moving elements defined thereby causes the chain to move alternately over the sprockets and over the complementary sprockets.

18. A chain transmission according to claim 5, wherein the chain transmission is accommodated in a closed, self-supporting casing built up of interconnected casing members.

19. A vehicle provided with a chain transmission according to claim 5.

20. A chain transmission according to claim 5, wherein the gear shifting shaft extends parallel to the driving shaft and the driven shaft.

* * * * *